May 29, 1973   I. SCHRIER   3,736,183
APPARATUS FOR AND METHOD OF EDGE MACHINING
FLEXIBLE CONTACT LENSES
Filed July 6, 1971
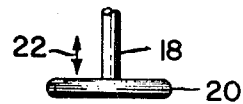
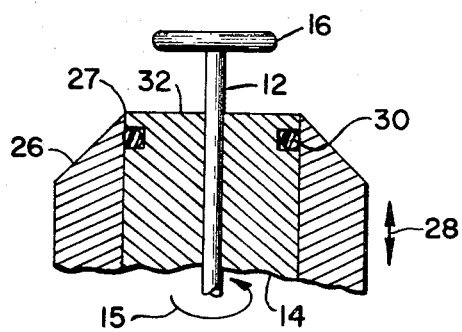
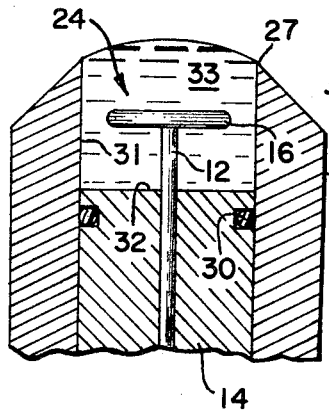
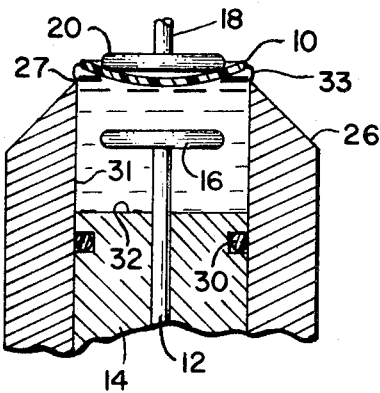
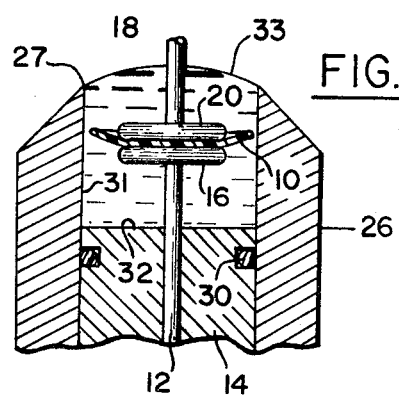
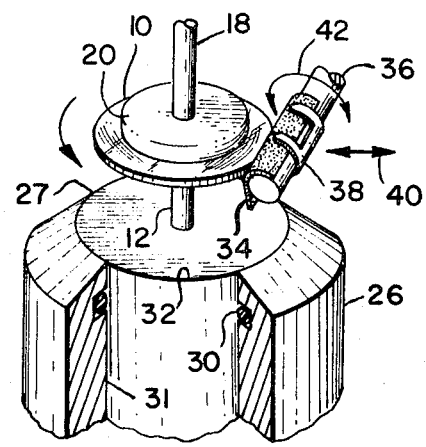
ISRAEL SCHRIER
*INVENTOR.*
BY
BERNARD D. BOGDON
ATTORNEY United States Patent Office 3,736,183
Patented May 29, 1973

3,736,183
APPARATUS FOR AND METHOD OF EDGE
MACHINING FLEXIBLE CONTACT LENSES
Israel Schrier, 30 Northfield Road,
Irondequoit, N.Y. 14617
Filed July 6, 1971, Ser. No. 160,015
Int. Cl. B08b 7/00, 3/00; B24b 7/00, 9/00
U.S. Cl. 134—33                                    8 Claims

ABSTRACT OF THE DISCLOSURE

A machine for centering a hydrophilic lens between rotatable spindles to engage a polishing pad for contouring the edge of the lens comprises a rotatable spindle having an extensible sleeve concentrically disposed about it for raising to form a chamber for holding a fluid for floating and centering a hydrophilic lens. A clamping spindle is provided for engaging and moving the hydrophilic lens against the rotatable support spindle and to thereafter cooperatively spin the lens to displace fluids therefrom to condition the edge of the lens for contouring by engaging a slurry coated polishing pad. A novel method for preparing the hydrophilic lens for polishing comprises the steps of floating the lens on the fluid filled chamber, centering the lens concentrically with the support spindle axis, concentrically clamping the lens upon the spindle and rotating the spindle to centrifugally displace at least some fluid from the lens and thereby condition the lens for contouring of its edge.

BACKGROUND OF THE INVENTION (1) Cross-reference to related application

The present invention is an improvement invention over that described in the concurrently filed patent application entitled Apparatus for and Method of Edge Machining Flexible Contact Lenses, Ser. No. 160,016 for applicant Raymond T. Blum.

(2) Field of the invention

This invention relates to a flexible ophthalmic lens edge contouring machine and the method of contouring the flexible ophthalmic lens and more particularly, to a flexible ophthalmic lens edging machine incorporating an apparatus for centering the lens and for centrifugally displacing fluids from the lens edge to condition the lens for edging.

(3) Description of the prior art

In the ophthalmic lens manufacturing industry, a contemporary development involving flexible and fluid carrying materials for manufacturing contact lenses will undoubtedly have a heavy impact upon the industry in future years. A whole new technology is being developed in order to manufacture these lenses. Of interest in the manufacturing of non-rigid contact lenses are economical methods of edge contouring the flexible materials in order to eliminate sharp features created thereat during the manufacturing, adding structural strength to the lens to preclude tearing thereof and providing more wearing comfort for the eyes of the user.

Early methods in the industry included hand finishing the non-rigid contact lenses which is easily recognized to be an entirely unsatisfactory operation for the present era of mass production. Subsequent developments included processes for soaking lenses in saline solutions shortly after the lenses are extracted from the molds. These processes involve displacing fluids from the non-rigid and generally hydrophilic lenses in an attempt to neutralize the saline solution and thereby dehydrate the lenses. This soaking operation generally demanded a lengthy period of time in the order of 24 hours or more. After lenses were soaked they were mounted and centered, as best possible, on machines for edge contouring. The centering devices on the machines were less than satisfactory and the condition of the lenses after soaking were very irregular for often the lens edges were rippled and showed evidence of nonuniform dehydration and often they were visibly warped.

In brief summary, the prior art methods and devices necessitated time consuming operations including lens soaking and resulted in inferior quality end products promoted by unsatisfactory lens centering apparatus and the nonuniform dehydrated condition of soaked lenses.

Attempts were made by those skilled in the art to eliminate the difficulties hereinbefore mentioned, and involved, for example, the methods and apparatus disclosed in U.S. Pat. 3,423,886 entitled, "Method Of Machine Non-Rigid Contact Lenses" issued to F. Schpak et al. on Jan. 28, 1969. In the Schpak et al. patent, which is directed to disclosure regarding non-rigid lenses of silicone rubber composition, the lens centering problems are not resolved and the contact lenses are rotated at relatively high revolutions per minute to prestress the peripheral edge portion sufficiently so as to be stress neutralized when engaged by a forming element during a machining operation. It is quite obvious to those skilled in the art that the disclosure in the Schpak et al. patent explains some of the problems and difficulties of machining thin flexible lens and suggests methods more useful on a limited production basis for a limited number of materials, but does not render assistance in the making of fluid carrying lenses, specifically those which are hydrophilic.

SUMMARY OF THE INVENTION

This invention overcomes the hereinbefore mentioned deficiencies in the prior art devices and systems by providing an improved apparatus for supporting a non-rigid contact lens for conditioning of the contact lens in preparation for edge contouring of the lenses. Embodiments according to the principles of this invention provide for centering a non-rigid contact lens upon rotatable supporting and clamping structure generally securing each lens at a central area of the lens. The supporting and clamping structure rotatably carries the lens at an angular velocity sufficient to dehydrate the lens edge without causing deformation or dehydration to the central supported and clamped area of the lens to thereby prepare the lens edge for edge contouring.

In preparation of the spinning operation of the lens, the lens is centered above the supporting structure by floating it on a fluid pool. The boundary of the pool may be defined by a collar structure concentrically disposed about the rotatable lens supporting structure. The fluid surface forms a meniscus of mounded or convex shape. A non-rigid contact lens is floated on the convex shaped meniscus surface of the fluid pool with the convex portion of the lens engaging the fluid surface. The collar is then generally adjusted to provide for uniform tension of the fluid surface which acts upon the lens to concentrically center it above the support structure. Afterwards, the rotatable clamping structure is caused to engage the surface of the non-rigid contact lens opposite that wetted by the fluid pool to forcibly carry a non-rigid contact lens into the pool to engage the supporting structure below the meniscus of the fluid pool. The fluid pool is drained and the supporting and clamping structure is caused to rotatably carry the non-rigid contact lens. A polishing pad carrying a suitable slurry is moved into engagement with the lens edge after the lens has been rotated for a length of time sufficient to dehydrate the lens at its edge. After the polishing is completed the edge contoured lens is removed. This invention thereby provides an apparatus for and a method accurately, expeditiously and inexpensively edge contouring the lens at a high rate of productivity.

BRIEF DESCRIPTION OF THE DRAWINGS

FIG. 1 illustrates a partial sectional view of an embodiment according to the principles of the invention, disclosing exemplary rotatable supporting and clamping spindles padded for retaining a non-rigid contact lens;

FIG. 2 illustrates the embodiment of FIG. 1 defining a fluid pool for supporting for centering a non-rigid contact lens;

FIG. 3 illustrates a non-rigid contact lens floated upon the fluid pool defined by the apparatus of FIG. 2;

FIG. 4 illustrates the pads of the rotatable supporting and clamping spindles of FIG. 1 engaging a centered non-rigid contact lens; and FIG. 5 is a partial perspective view of the non-rigid contact lens engaging a polishing pad for edge contouring of the lens according to the principles of the present invention.

DETAILED DESCRIPTION OF THE PREFERRED EMBODIMENT

A practical embodiment according to the principles of the invention is illustrated in the drawings at FIGS. 1–5. For generally carrying and supporting a non-rigid contact lens 10, there is provided a rotatable support or carrying spindle 12 journaled within a support base 14 as illustrated, for example, in FIG. 1. Any suitable power device such as a direct coupled electric or hydraulic motor is provided to rotatably drive the support spindle 12, for example, in the direction of the circular arrow 15. It will be appreciated that the support spindle 12 and the support base 14 can be formed as one integral unit and be caused to rotate in a similar manner. Affixed to the support spindle 12 is a support pad 16 for engaging generally the convex surface of the non-rigid contact lens 10. To provide for a secure but rather light engagement between the support pad 16 and the contact lens 10, the support pad 16 is generally formed of a resilient material, for engaging the contact lens 10 without deforming or marring the material of the lens. Materials for the manufacture of the non-rigid contact lenses are well known in the art. The support pad 16, for example, may be formed of a rubber material having a durometer hardness number of approximately 40.

Axially aligned to the rotatable support spindle 12 is a clamping spindle 18 having affixed thereto a clamping pad 20 for engaging the concave surface of the non-rigid contact lens 10. The clamping pad 20, for example, can be formed in a same suitable manner and of the same material as the supporting pad 16. The rotatable clamping spindle 18 is free to axially move in a downward direction to engage the lens 10 for clamping, and afterwards to move in an upward direction to release the lens 10, as indicated by the double ended arrow 22 of FIG. 1.

It will be appreciated that the clamping spindle 18 is caused to rotate in the same direction as the supporting spindle 12 and at the same rate. The apparatus used to rotatably drive the spindle 12 is readily adaptable to similarly rotate the clamping spindle 18 either by synchronized direct drive or by direct coupling when the support and clamping pads 16 and 20, respectively, engage the contact lens 10.

To provide for centering of the lens 10 a fluid pool 24 is formed, as illustrated in FIG. 2, by raising an extensible sleeve 26 in the upward direction of the double ended arrow 28. The sleeve 26 is generally cylindrical and is concentrically journaled about the relatively fixed base 14 and sealed in a fluid tight engagement thereto, for example, by an O-ring 30, as illustrated in FIG. 2. Once the extensible sleeve 26 is raised to the relative height, as illustrated in FIG. 2, any suitable fluid dispensing apparatus is used to fill the fluid pool formed between the inner surface 31 of the sleeve 26 and an upper face 32 of the fixed base 14 up to a knife edge 27 of the sleeve 26. Any suitable fluid 33 may be used to fill the fluid pool 24, for example, distilled water has proven quite satisfactory.

It will be noted, as illustrated in FIG. 2, that the fluid 33 filling the pool 24 generally forms a convex meniscus at the surface. This configuration of the fluid surface is promoted by the configuration and the use of non-wetting materials, like stainless steel, for elements like the extensible sleeve 26. It will be appreciated, of course, that the materials for such elements are generally selected to be non-corrosive which is desirable.

As illustrated in FIG. 3, the non-rigid contact lens 10 is floated upon the meniscus of the fluid pool 24 with the convex surface of the lens 10 engaging the initially convex fluid surface. In the illustrated exemplary embodiment, according to the principles of this invention, great care is taken to vertically linearly align the support spindle 12 and the clamping spindle 18, to concentrically dispose the respective pads 16 and 20 thereon and to concentrically dispose the extensible sleeve 26 thereabout to insure that the apex of the convex configuration of the fluid meniscus is in axial alignment with the support and clamping spindles 12 and 18, respectively. Because of the designed symmetrical configuration of the non-rigid contact lens 10, the lens 10 can be uniformly affected by the surface tension of the fluid 33 of the pool 24. Correspondingly, the center of the lens 10 axially aligns with the axes of the support and clamping spindles 12 and 18, respectively, when the lens 10 is floated on the fluid surface with the convex surface of the lens uniformly wetted by the fluid 33 of the pool 24 where the periphery of the lens is separated from the knife edge of the collar by a uniform annular ring of fluid. This is provided by a slight adjustment upwards of the sleeve 26 after the lens 10 is initially floated upon the surface of the fluid pool 24. This adjustment is generally necessary in order to compensate for nonuniform filling of the fluid pool 24 and for the typical non regular flaccid state of a nonconstrained fluid carrying lens. In operation, as the collar 26 is adjusted it can be observed that the once flaccid lens is caused to become quite regular and conform to its designed configuration when its convex surface is wetted and the annular ring of fluid surrounds its periphery.

After stabilization of the floating lens 10, which requires very little time and effort, the clamping spindle 18 is caused to be lowered, as shown in FIGS. 3 and 4, by a weight suitable for lowering the axially aligned clamping pad 20 into engagement with the concave surface of the lens 10, but not with so great a force as to cause deformation or change in the surface configuration of the lens 10. The clamping pad 20 forcibly carries the lens 10 downward to engage the relatively stationary support pad 16. Once engagement between the convex and concave lens surfaces and their respective supporting and clamping pads 16 and 20, respectively, has been accomplished, the extensible sleeve 26 is moved in the downward direction of the double ended arrow 28 to release the fluid 33 and to expose the non-rigid contact lens 10 at substantially only its edge area to the ambient conditions of the environment.

Rotation of the support spindle 12 causes the lens 10 and the clamping spindle 18 to cooperatively rotate either through direct engagement with the driving means for the support spindle 12 or just due to the frictional engagement promoted by the weight between the clamping spindle 18 and the lens 10. Rotation at, for example, 4,200 to 4,800 revolutions per minute is continued for a predetermined amount of time, for example, approximately 30 seconds to dehydrate the lens at substantially only its edge, the centermost portion being protected by the elastic material of the support and clamping pads 16 and 20. It should be understood that the optimum rotational speed is dependent upon the lens configuration and composition and may equally as well be outside the hereinbefore stated exemplary rotational speed range. It will also be appreciated that many varied materials can be used to shield the center portion of the lens 10 during the spinning operation to prevent or slow down the dehydration of the lens due to the fluid being centrifugally forced off the lens.

Once the lens edge is sufficiently dehydrated a polishing pad 34, carried by a polishing pad support arm 36 and affixed thereto by a resilient polishing pad clamp 38, is brought, in the direction of the left arrowhead of the double ended arrow 40 of FIG. 5, into engagement with the lens 10. The polishing pad 34 is generally saturated with a suitable non-aqueous slurry and is continuously alternately oscillated in the direction of the double ended arcuate arrow 40 while engaging the rotating lens 10. The oscillating support arm 36 is driven by any suitable means. The polishing pad 34 may be formed of any suitable material, for example, wool felt. Polishing is continued for an amount of time, for example 30 seconds, sufficient to properly contour the lens edge.

Having thus described the invention by way of an illustrative example of a practical embodiment, what is claimed as new is:

1. A machine for conditioning a fluid carrying non-rigid lens for edge contouring, wherein the lens has first and second shaped surfaces, comprising:
    a support spindle for supporting the non-rigid lens;
    lens centering means including a fluid pool for concentrically disposing a non-rigid lens relative to the axis of the support spindle;
    holding means for engaging the first surface of the non-rigid lens and including means for relatively moving the second surface of the non-rigid lens into concentric engagement with the support spindle; and
    means for rotating the concentrically disposed lens upon the support spindle to condition the edge of the lens for contouring by centrifugally displacing fluid from the non-rigid lens.

2. A machine for conditioning a fluid carrying non-rigid lens for edge contouring, wherein the lens has first and second shaped surfaces, comprising:
    a support spindle for supporting the non-rigid lens;
    a sleeve concentrically disposed about the support spindle extensible in the direction of the axis of the support spindle to define a chamber for holding a fluid for concentrically disposing the non-rigid lens relative to the axis of the support spindle;
    holding means for engaging the first surface of the non-rigid lens and including means for relatively moving the second surface of the non-rigid lens into concentric engagement with the support spindle; and
    means for rotating the concentrically disposed lens upon the support spindle to condition the edge of the lens for contouring by centrifugally displacing fluid from the non-rigid lens.

3. The machine for conditioning a non-rigid lens for edge contouring, as defined in claim 2, wherein:
    the sleeve concentrically disposed about the support spindle is defined by a frustum of a cone having an aperture concentrically disposed about and extending in the direction of the axis of the cone linearly aligned with the axis of the support spindle.

4. The machine for conditioning a non-rigid lens for edge contouring, as defined in claim 2, wherein:
    the support spindle and holding means each individually carry resilient pads for engaging the non-rigid lens.

5. The machine for conditioning a non-rigid lens for edge contouring, as defined in claim 2, further including polishing means for engaging the non-rigid lens supported by the support spindle.

6. The polishing means, as defined in claim 5, comprising:
    a polishing pad supported by a movable polishing mount operable to engage the edge of the non-rigid lens.

7. The polishing means, as defined in claim 6, further including means for oscillating the polishing pad when engaged with the edge of the non-rigid lens.

8. A method of conditioning a fluid carrying lens for edge contouring, comprising:
    forming a fluid pool in a cylindrically shaped chamber;
    floating the fluid carrying lens upon the surface of the fluid pool to thereby concentrically dispose the lens with the axis of the cylindrically shaped fluid chamber;
    engaging the lens concentrically with a rotatable spindle;
    separating the fluid carrying lens from the fluid pool while maintaining the engagement of the lens and the spindle; and
    rotating the spindle to centrifugally displace fluid from the fluid carrying lens.

References Cited

UNITED STATES PATENTS

| | | | |
|---|---|---|---|
| 3,423,886 | 1/1969 | Schpak et al. | 51—281 R |
| 3,353,303 | 11/1967 | Stern | 51—284 X |
| 3,237,349 | 3/1966 | Faas et al. | 51—284 |
| 2,674,068 | 4/1954 | Eves et al. | 51—284 X |
| 2,352,616 | 7/1944 | Canning | 51—284 |

JAMES L. JONES, JR., Primary Examiner

U.S. Cl. X.R.

51—58, 67, 217; 134—157